United States Patent [19]
Kivela

[11] Patent Number: 5,854,970
[45] Date of Patent: Dec. 29, 1998

[54] ACCESSORY RF UNIT FOR HAND-HELD WIRELESS TELEPHONE SYSTEMS

[75] Inventor: Seppo Kalervo Kivela, Salo, Finland

[73] Assignee: Nokia Mobile Phones Limited, Salo, Finland

[21] Appl. No.: 730,458

[22] Filed: Oct. 8, 1996

[51] Int. Cl.⁶ .................................................. H04B 1/38
[52] U.S. Cl. ......................... 455/90; 455/575; 455/129; 343/702
[58] Field of Search .............................. 455/575, 90, 128, 455/129, 97, 117, 348, 349, 351; 343/702, 749, 859, 724

[56] References Cited

U.S. PATENT DOCUMENTS

| | | | |
|---|---|---|---|
| 3,099,807 | 7/1963 | Oh | 333/98 |
| 4,220,955 | 9/1980 | Frye | 343/703 |
| 4,998,078 | 3/1991 | Hulkko | 333/109 |
| 5,204,687 | 4/1993 | Elliott et al. | 343/702 |
| 5,338,896 | 8/1994 | Danforth | 455/90 |
| 5,341,149 | 8/1994 | Valimaa et al. | 343/895 |
| 5,524,284 | 6/1996 | Marcou | 455/129 |
| 5,532,703 | 7/1996 | Stephens et al. | 343/702 |
| 5,561,439 | 10/1996 | Moilanen | 343/846 |
| 5,564,094 | 10/1996 | Egashira | 343/702 |
| 5,590,417 | 12/1996 | Rybeck | 455/351 |
| 5,594,459 | 1/1997 | Hirota | 343/749 |
| 5,613,221 | 3/1997 | Hunt | 455/90 |
| 5,640,689 | 6/1997 | Rossi | 455/90 |
| 5,711,014 | 1/1998 | Crowley et al. | 455/575 |

FOREIGN PATENT DOCUMENTS

| | | |
|---|---|---|
| 0 603 081 A1 | 6/1994 | European Pat. Off. . |
| 0 603 082 A1 | 6/1994 | European Pat. Off. . |
| 0 663 734 A1 | 7/1995 | European Pat. Off. . |
| 44 20 121 A1 | 12/1995 | Germany . |
| 2 280 322 | 1/1995 | United Kingdom . |
| WO 94/18817 | 8/1994 | WIPO . |
| WO 94/21053 | 9/1994 | WIPO . |
| WO 95/31048 | 11/1995 | WIPO . |

OTHER PUBLICATIONS

"The ARRL Handbook for the Radio Amateur", American Radio Relay League, Newington,CT, 61st Ed. 1990, pp. 2–17–2–19, 3–1–3–5.

*Primary Examiner*—Nguyen Vo
*Assistant Examiner*—Edan Orgad
*Attorney, Agent, or Firm*—Perman & Green, LLP

[57] ABSTRACT

An accessory RF unit, used in combination with a hand-held wireless phone, is designed to raise the antenna of the phone above the user's head such that shadowing effects caused by the user's head or body are minimized during phone operation. The accessory RF unit is placed over an existing radiating element of the phone and the communication signals originating in the phone are electromagnetically coupled to an accessory antenna within the accessory RF unit. Similarly, communication signals originating from a base station can be received by the phone. The accessory RF unit is easily attached and removed without the need for additional tools or the removal of an exiting antenna as part of the wireless phone. A coil circumferentially surrounds the phone's antenna for bidirectionally coupling RF energy from and to the accessory antenna.

17 Claims, 6 Drawing Sheets

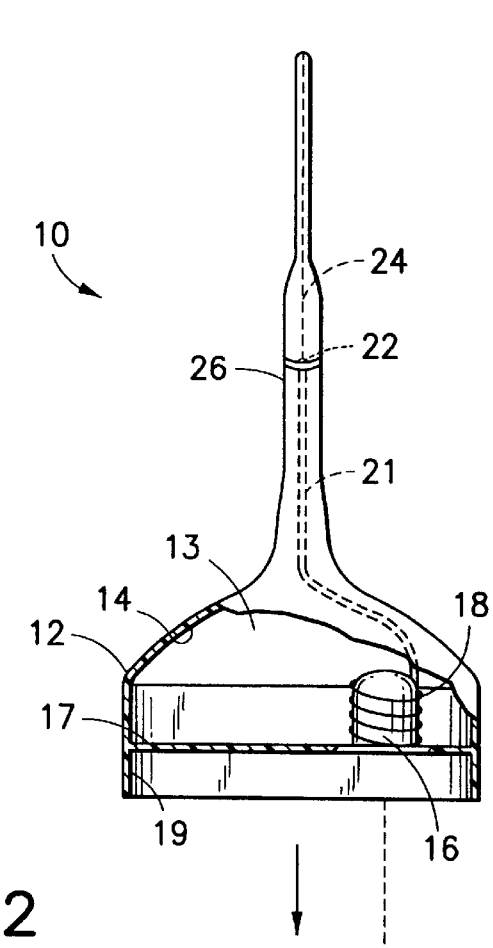
FIG. 2
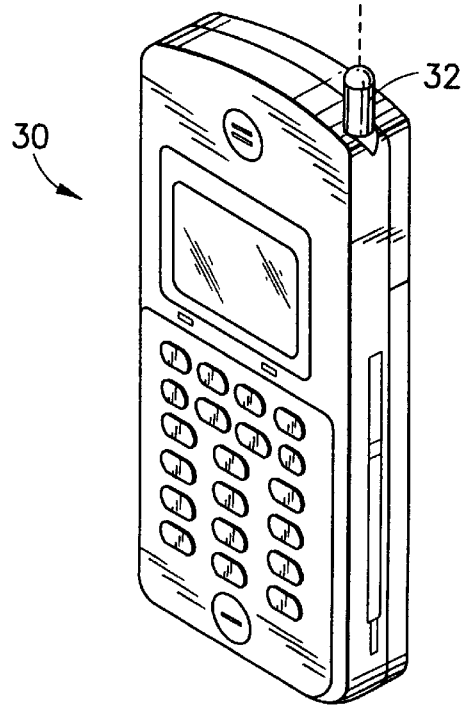

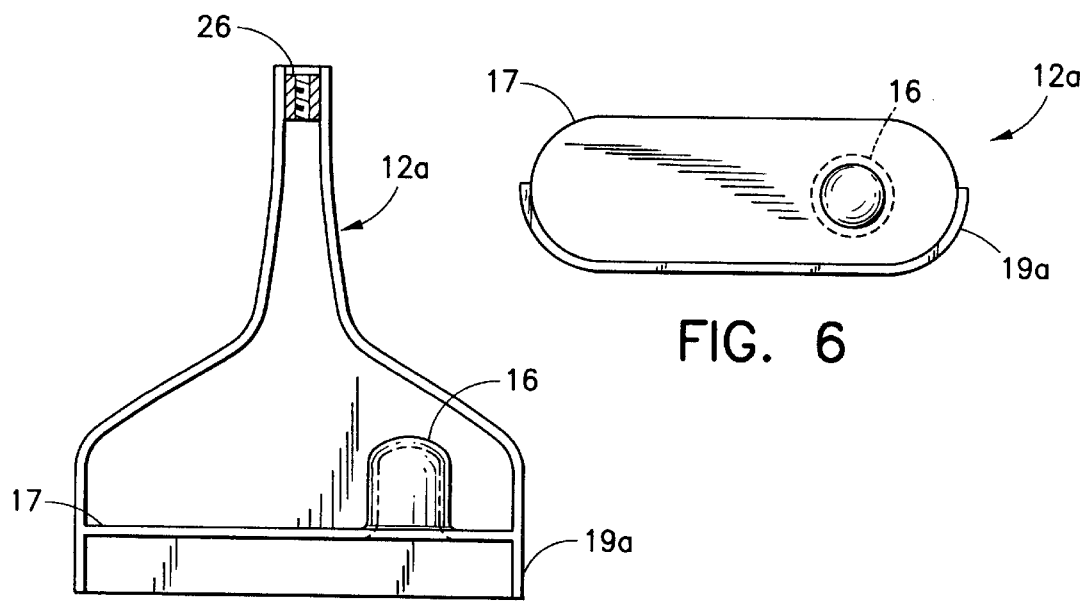
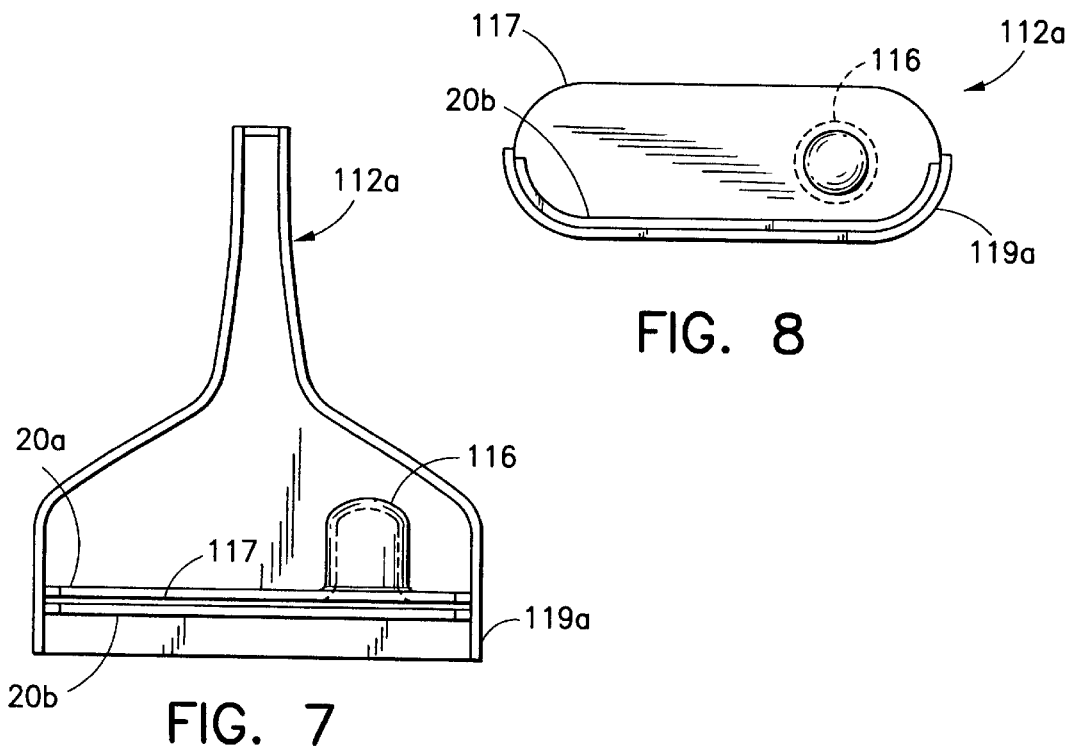

ACCESSORY RF UNIT FOR HAND-HELD WIRELESS TELEPHONE SYSTEMS

FIELD OF THE INVENTION

The present invention relates to hand-held communication systems and more particularly, to an accessory antenna for a hand-held wireless telephone.

BACKGROUND OF THE INVENTION

A hand-held wireless telephone typically has an antenna mounted in close proximity to the phone housing. In use, since the antenna is also close to the head of a user, the user's head can effect the ability of the phone to communicate with a base station by shadowing the telephone antenna, blocking the transmission between the wireless telephone and the base station. For example, when a user is receiving information from the base station, if the field strength generated by the base station is not sufficient to overcome the effects of the user's head, which is located between the base station and the telephone, the transmission will not be properly received. In similar fashion, the user's head may prevent the base station from receiving a signal transmitted by the phone.

One way to overcome the effects of the attenuation induced by the user's head during transmission is by increasing the phone transmitter power level. However, this is undesirable since an increase in transmitter power level would effectively reduce the operating time of a battery operated hand-held phone.

There are devices which decrease the radiation from a hand-held wireless phone towards the user's head. These devices generally comprise a form of shielding, as part of the wireless phone, disposed between the antenna of the phone and the user's head. For example, PCT Patent no. WO 94/18817 (Sepponen) discloses a shielding layer attached to the phone. The shielding layer is positioned between the antenna of the phone and the user's head, shielding the head from electromagnetic radiation.

Similarly, publications WO 9531048 (Daniels) and DE 4420121 (Kuschmierski) disclose systems that are similar to that of Sepponen. While these devices decrease the amount of electromagnetic radiation directed towards the user's head, the effective operating range of the phone is limited by the shield distorting the radiating pattern associated with the phone antenna. As discussed above, in response to the distorted radiating pattern, the power to the transmitter is increased which in turn decreases battery life.

Another way to decrease the radiation of a hand-held phone directed towards a user's head, thereby minimizing the effects of the user's head on the phone antenna radiation pattern, is to physically move the phone's antenna away from the user's head. UK Patent no. GB 2280322 (Yoshihara), for example, discloses a portable radio apparatus having a mechanism for displacing the associated antenna away from the user's head during operation. Such a device, while it may decrease the radiation directed towards the user's head, still suffers performance degradation caused by the user's body being in the path of transmission.

Similarly, European Patent nos. EP 603801 and EP 603802 (Grangeat) disclose a portable phone system which provides a protective cover which in turn physically maintains a minimum distance between the phone antenna and the user's head. As with the Yoshihara device, the Grangeat device, while decreasing electromagnetic energy directed towards the user's head, positions the antenna such that under certain situations the user's head may shadow the wireless telephone antenna resulting in poor communication between the phone and the base station. In a separate embodiment of the Grangeat invention an electromagnetic absorbent screen may be placed between the antenna and the user's head, further reducing the electromagnetic energy directed towards the user's head. This embodiment does not, however, solve the shadowing problem and, furthermore, reintroduces problems related to the radiating pattern of the antenna, as discussed above.

Alternatively, WO 94/21053 (Dickie) discloses an antenna fixture which attaches to a hand-held phone and comprises a shielded body and a retractable antenna. The antenna fixture shields the user's head from electromagnetic radiation by displacing the phone antenna away from the user's head. The antenna, however, is extended downwardly past the mouth piece of the phone, which apparently will result in the user's body shadowing the antenna and disrupting communication between the phone and the base station.

Even if the rod antenna extended upwards, as in U.S. Pat. No. 5,204,687 (Elliot), the feed point of the rod antenna is still below the top of the phone user's head such that at least a portion of the radiating pattern of the antenna is effected by the user's head. Elliot further discloses a helical coil antenna which becomes the active radiating element for the phone when the rod antenna is retracted. However, the feed point of the coil antenna, like that of the rod antenna, remains in close proximity to the top of the hand-held phone and below the top of the user's head, whereby the shadowing effect of the user's head is still present.

Additionally, the Dickie antenna fixture requires a galvanic contact between the phone and the antenna fixture. Such a connection is subject to mechanical wear and exposure to environmental elements, such as dirt and moisture, which could lead to reduced performance or failure. Further, the Dickie fixture requires the removal of the original phone antenna before installation.

OBJECTS OF THE INVENTION:

It is a first object of this invention to decrease radiation towards the head of a hand-held wireless telephone user, while not adversely affecting the radiation pattern of the phone antenna.

Another object of this invention is to decrease radiation towards a phone user's head without the need for a galvanic contact to a second antenna.

Still another object of this invention is to provide the desired results with a device which is easily adapted and installed on hand-held phones without the need for additional tools or mounting hardware, and without the need to remove hardware, such as an antenna, from the wireless telephone.

SUMMARY OF THE INVENTION

The foregoing and other problems are overcome and the objects of the invention are realized by apparatus in accordance with embodiments of this invention. In accordance with one embodiment of the invention an accessory RF unit, used in combination with a hand-held wireless telephone, decreases radiation directed towards the user's head while minimizing shadowing effects caused by a portion of the user's body located between the phone and a base station. The accessory RF unit comprises a housing, a coupler for retaining the housing to the wireless telephone, an electric coil electromagnetically coupled with the wireless telephone antenna, an accessory antenna, and an electrical conductor, wherein the conductor electrically couples the electric coil with the accessory antenna.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 is a perspective view of the accessory RF unit and a hand-held wireless telephone;

FIG. 5 is a front plane view of the bottom portion of the accessory RF unit housing;

FIG. 6 is a bottom plane view of the bottom portion of the accessory RF unit housing of FIG. 4;

FIG. 7 is a front plane view of an alternative embodiment of the bottom portion of the accessory RF unit housing;

FIG. 8 is a bottom plane view of the alternative embodiment of FIG. 6;

DETAILED DESCRIPTION OF THE INVENTION

Figure 1A:
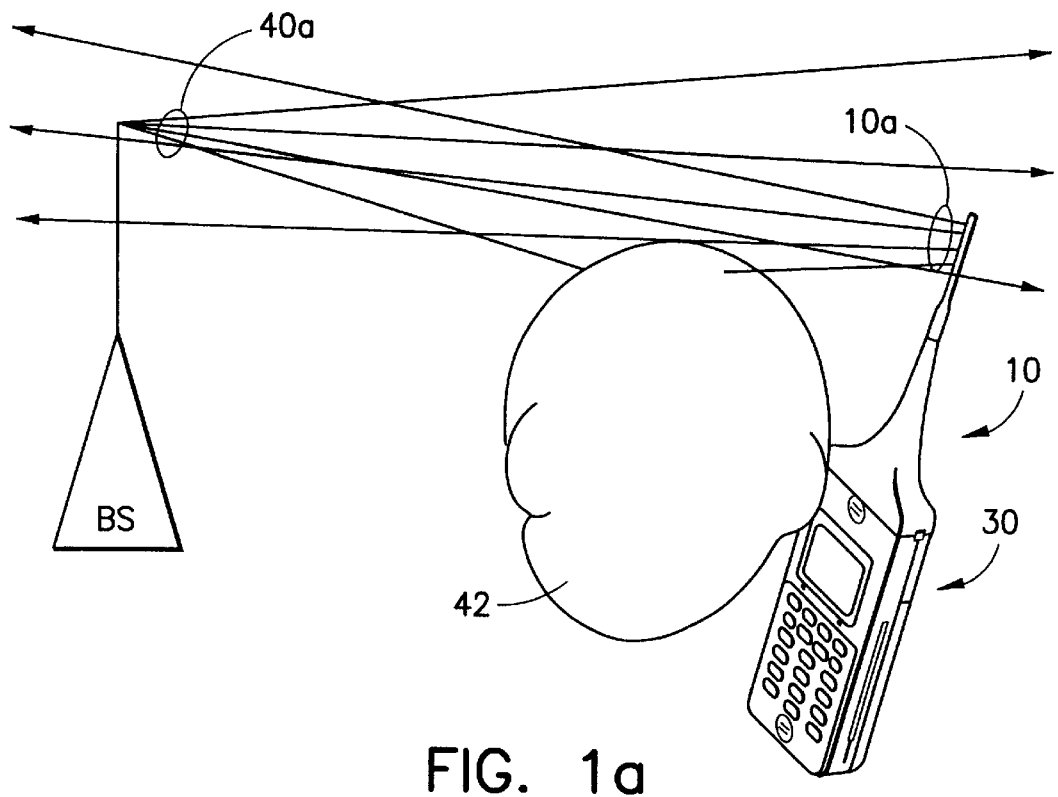
FIG. 1a is a perspective view of a hand-held wireless telephone in use by a user with the accessory RF unit attached.
Figure 1B:
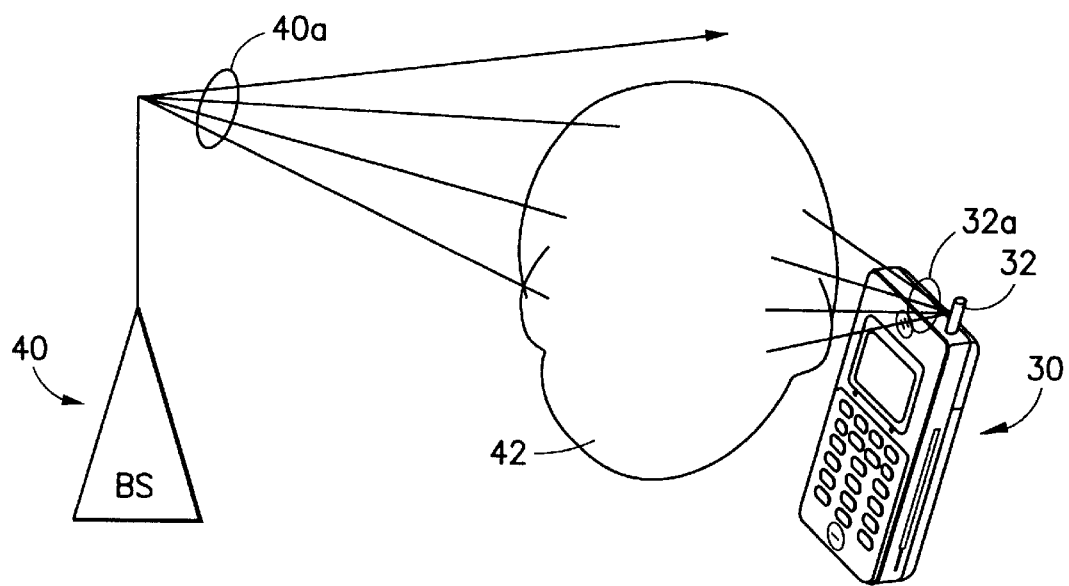
FIG. 1b is a perspective view of a hand-held wireless telephone in use by the user without the accessory RF unit attached.

Referring to the accompanying drawings, FIGS. 1a and 1b depict the effects of a user's head during operation of a typical hand-held wireless telephone, with and without the accessory RF unit, respectively. Specifically, FIG. 1a depicts a base station 40 transmitting and receiving RF signals, in part, along lines 40a. Similarly, a hand-held wireless telephone 30 with accessory RF unit 10 attached transmits and receives RF signals, in part, along lines 10a. It should be apparent that FIG. 1a, since the point at which phone 30 transmits and receives information has been elevated to the top of the accessory RF unit 10, the head 42 of a user operating the hand-held phone 30 does not adversely affect the RF signals involved.

Referring now to FIG. 1b, the hand-held phone 30 of the prior art is shown without the accessory RF unit 10 attached, thereby forcing the phone 30 to rely on an antenna 32, a standard part of the phone 30, to transmit and receive the RF signals. Since the user's head 42 is located between the base station 40 and the antenna 32, the RF patterns generated by the base station 40 and the antenna 32 along lines 40a and lines 32a respectively, are adversely affected by the head 42 of the user, resulting in signal attenuation.

Referring to FIG. 2, the accessory RF unit 10 in accordance with this invention is shown. The accessory RF unit 10 is generally comprised of a housing 12, an electric coil 18, an electrical conductor 21, and a accessory antenna 24. The housing 12 may be molded from a suitable material, such as lightweight, somewhat flexible plastic, and as a result of the molding process includes a housing support 17, a housing lip 19, a receiving recess or cup 16 and an interior space 13. The housing 12 is molded so as to have a bottom surface area that is slightly larger than the outside dimension of the phone 30, and the interior diameter of the cup 16 is slightly larger then the diameter of the antenna 32. In a preferred embodiment the inner surface of housing 12 is coated with a conductive coating 14. The coating 14 prevents electromagnetic energy present in the interior space 13 from passing through the surface of the housing 12.

Figure 10:
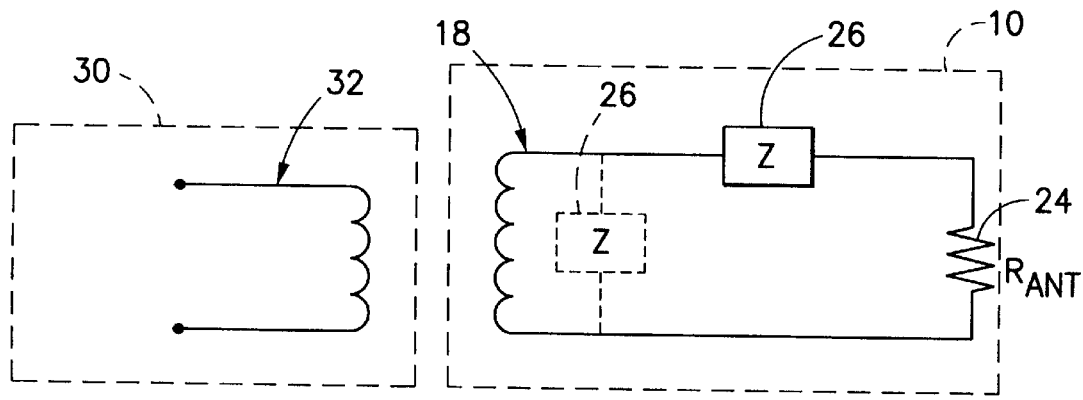
FIG. 10 is an electrical schematic view of the accessory RF unit interfaced with a hand-held wireless telephone.

Within the housing 12, an electric coil 18 is positioned circumferentially around the cup 16 and provides electromagnetic coupling with the antenna 32 located on the wireless phone 30 when the accessory RF unit is positioned operably on the phone 30. To maximize signal coupling between the phone 30 and the accessory RF unit 10, coil 18 may be tuned to match the transmitting carrier frequency used by the transmitter of phone 30, whereby the antenna 32 of phone 30 together with coil 18 of the accessory RF unit 10 act as a tuned RF transformer. Briefly referring to FIG. 10, an electrical schematic view of the accessory RF unit 10 interfaced with the output antenna 32 of phone 30 is shown. Coil 18 may be tuned using self-resonant properties associated with coil 18 or using external reactance z (capacitance or inductance) disposed electrically parallel to (shown in dashed line), or in series with coil 18 with respect to the accessory antenna 24 ($R_{ant}$). Additionally, if accessory RF unit is operably connected to a multi-band phone, one that transmits at more than one frequency band, coil 18 may comprise a separate coil for each frequency band, each tuned to match one of the transmitting carrier frequencies used by the transmitter of phone 30. In this case the antenna 24 may be dual band antenna or two separate antennas.

Additionally, to achieve maximum power transfer from antenna 32 of phone 30 to the accessory RF unit 10, the input impedance of the accessory unit 10 can be adjusted to equal the output impedance of the transmitter circuit of phone 30, by either adding reactance 26, capacitance or inductance, disposed parallel to or in series with coil 18, or by increasing or decreasing the inductance of coil 18 by increasing or decreasing, respectively, the number of turns which make up coil 18. One end of the coil 18 is coupled to ground of the accessory antenna unit.

Referring back to FIG. 2, an electrical conductor 21 electrically connects the coil 18 with the accessory antenna 24 via the feed point 22. Typically, the electrical conductor 21 is a coaxial cable suitable for conducting an RF signal. The accessory antenna 24 may be connected to the housing 12 in any suitable fashion. For example, a coupler 26 may be provided allowing the accessory antenna 24 to be easily removed, thereby allowing replacement of a damaged accessory antenna 24. The coupler 26 may comprise an internally threaded insert which receives an externally threaded portion which protrudes from the bottom portion of the accessory antenna 24. The accessory antenna 24 may be designed instead to retract within the housing 12, thereby reducing the chance of damage to the accessory antenna 24 when not in use.

The accessory antenna 24 may be any suitable high quality antenna, and could be identical or similar to the antenna 32. For example, accessory antenna 24 may be a helical type antenna. Preferably the accessory antenna 24 is a monopole antenna, however a dipole antenna may be used. When the accessory antenna 24 is a monopole antenna the coating 14 provides a good large ground plane while also serving to decrease radiation emitting from the housing 12. While it is possible to use the accessory RF unit 10 with a phone 30 which utilizes an internal antenna element (not shown), performance is maximized with an external helical type antenna 32, either fixed or retractable. Additionally, and as was mentioned previously, if accessory RF unit 10 is operably attached to a dual band phone, accessory antenna 24 may be a dual band antenna or may comprise two separate antennas, each tuned to one of two carrier frequency bands used by phone 30.

In a preferred embodiment, the housing 12 is molded such that the feed point 22 is sufficiently raised above the top of the wireless phone 30, whereby the user's head will not shadow the accessory antenna 24.

Figure 3:
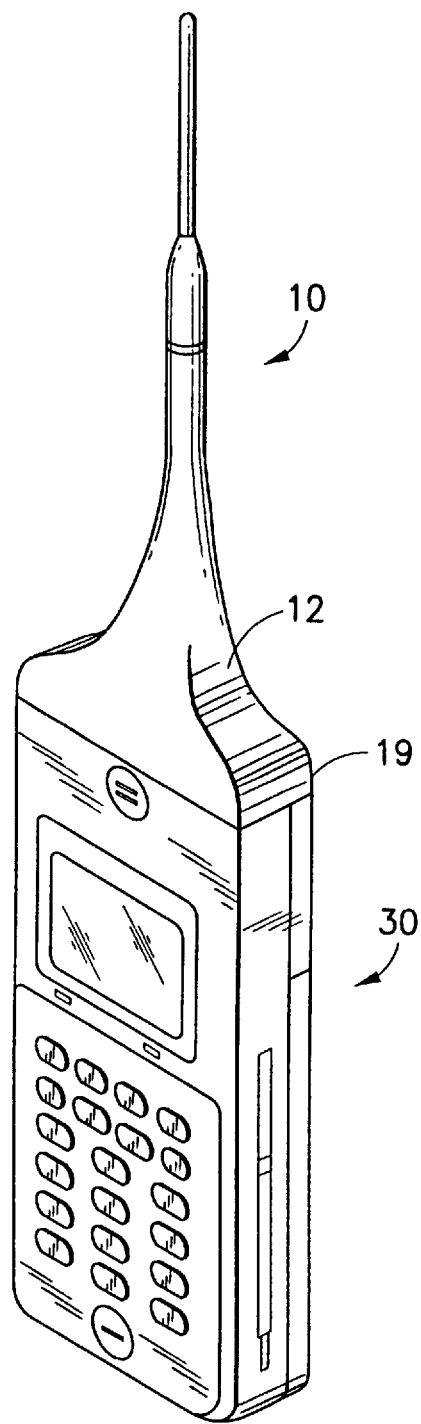
FIG. 3 is a perspective view of the accessory RF unit attached to a hand-held wireless telephone.
Figure 4:
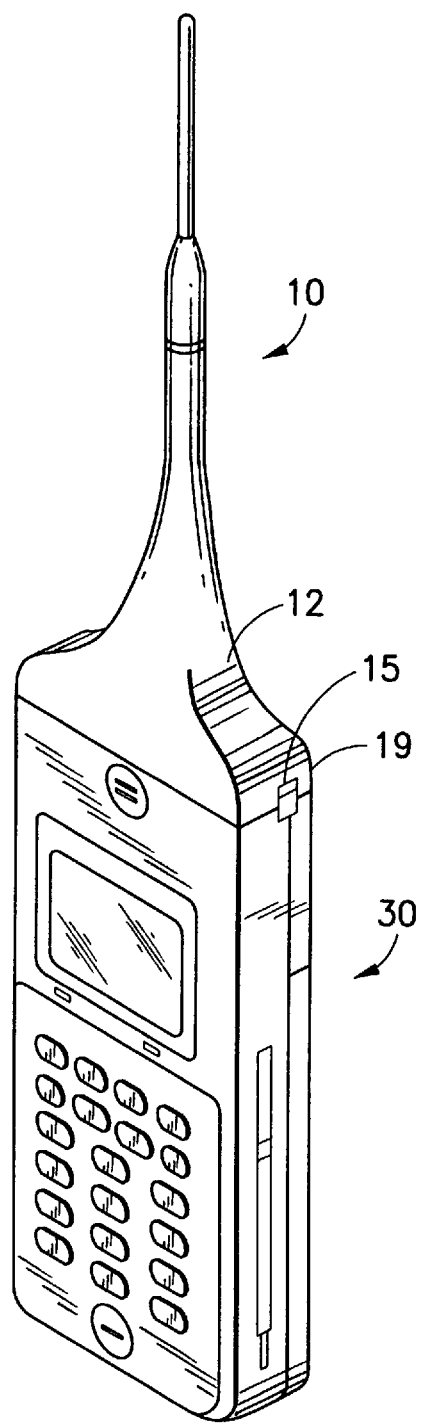
FIG. 4 is an alternative embodiment of the accessory RF unit attached to a hand-held wireless telephone.

Referring next to FIG. 3, the preferred embodiment of the accessory RF unit 10 attached to the wireless phone 30 is shown. The lip 19 of housing 12 is sufficiently flexible to provide a suitable compression fit between the housing 12 and the top of the phone 30, thereby physically coupling the accessory RF unit 10 to the phone 30. While a compression fit is the preferred method of coupling the accessory RF unit 10 to the phone 30, any suitable method can be used. For example, briefly turning to FIG. 4, an alternative embodiment of accessory unit 10 is shown whose housing comprises a plastic clip 15 which engages a mating surface of phone 30.

Turning now to FIGS. 5 and 6, an example of housing 12 construction is shown. While the construction of housing 12 can be achieved through any suitable reasonable method which allows for the operation of the accessory RF unit 10, FIGS. 5 and 6 depict housing 12 construction as comprising a bottom portion 12a which mates with a top portion 12b (not shown). The bottom portion 12a further comprises the housing support 17, the receiving cup 16, and a bottom lip portion 19a of the housing lip 19. The surface of support 17 adjacent to the top portion 12b of housing 12 is molded to follow the contour of the top portion 12b of housing 12, thereby providing a sealed housing 12 along support 17. Further, the housing 12 may be molded such that the incorporation of the coupler 26 is readily feasible. For example, the housing 12 may be molded such that when the bottom portion 12a and the top portion 12b are brought together to form housing 12 a void is created wherein an internally threaded receptacle, as the coupler 26, is held fast, thereby preventing rotational motion of the receptacle when the accessory antenna 24 is secured.

The bottom portion 12a and the top portion 12b (not shown) of housing 12 may be held together using any suitable method including the use of appropriate adhesives, or fasteners including screws or a combination of nuts and bolts, all of which are compatible with the material used to mold housing 12 such that degradation of the housing 12 does not occur.

Referring to FIGS. 7 and 8, an alternate embodiment of housing 12 construction is shown. FIGS. 7 and 8 depict the construction of a housing 112 as comprising a bottom portion 112a, a top portion 112b which mates with the bottom portion (not shown), and a housing support 117 which further includes a receiving cup 116, whereby housing support 117 is exchangeable with an alternative housing support 117 comprising a receiving cup 116 of different proportions, to adapt housing 112 to different types of phone body 30 and antenna 32 system designs. The bottom portion 112a and the top portion 112b of housing 112 further comprise a bottom lip portion 119a and a top lip portion 119b respectively. The bottom portion 112a and top portion 112b include a guide 20a and a guide 20b which retain housing support 117 at a specific location within housing 12.

Figure 9:
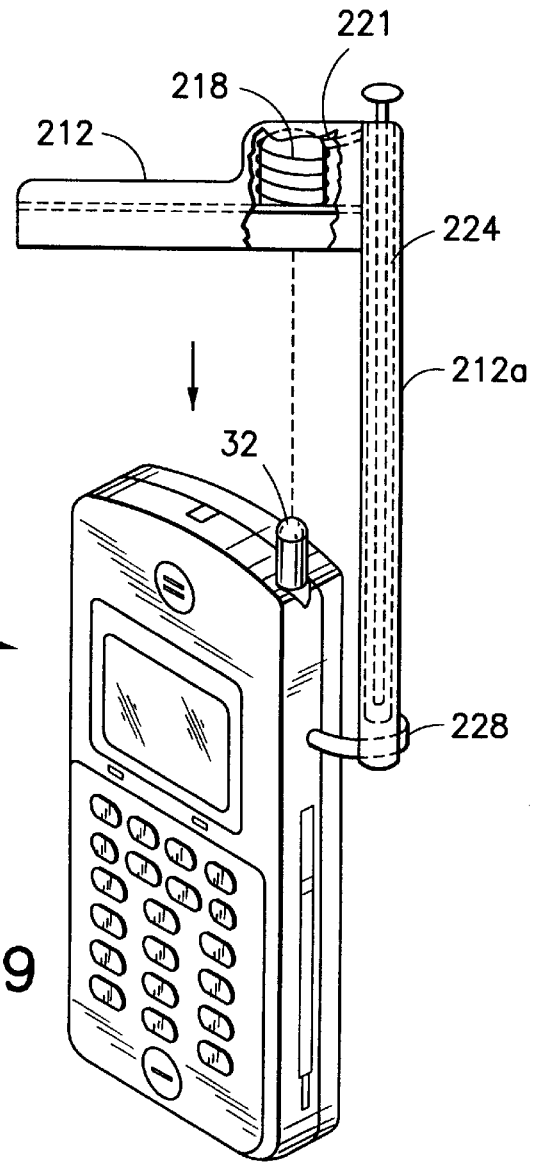
FIG. 9 is a front plane view of an alternative embodiment of the accessory RF unit housing.

Referring next to FIG. 9, an alternative embodiment of housing 112 of the accessory RF unit 10 is shown. A housing 212 comprises a cylindrical tube 212a which houses a telescoping accessory antenna 224. Telescoping accessory antenna 224 further comprises an upper radiating portion and a lower elevating portion, whereby, in operation, when the accessory antenna 224 is extended the upper radiating portion is held above the hand-held phone user's head, reducing the shadowing effects of the user's head on the radiating patterns of the upper radiating portion of accessory antenna 224. Housing 212 is constructed to encase an electric coil 218 and an electrical conductor 221, whereby an overall lower profile is achieved when accessory RF unit 10 is operably attached to hand-held phone 30. Electric coil 218 and electrical conductor 221 are operably equivalent to electric coil 18 and electrical conductor 21, respectively.

Cylindrical tube 212a of housing 212 may be held to the side of phone 30 using any convenient method. For example, a retaining clip 228 may be provided at the lower end of cylindrical tube 212a, whereby the clip 228, initially biased, provides a compression fit with the lower side portion of phone 30. In another alternative embodiment housing 212 may be constructed such that cylindrical tube 212a is formed at the rear of housing 212 and the lower end of cylindrical tube 212a is attached to the lower back portion of phone 30.

In operation, accessory RF unit 10 is placed and retained on the top of phone 30 such that the antenna 32 of phone 30 is positioned within the cup 16. When the phone 30 is communicating with a base station, the signal of the phone antenna 32 is electromagnetically coupled with the electric coil 18. As described above, the housing 12 is constructed such that the interior diameter of cup 16 is slightly larger than the diameter of the antenna 32, thereby minimizing electromagnetic loss. Electrical conductor 21 bidirectionally conducts the RF signal between the coil 18 and the feed point 22, which in turn provides the signal to or receives a signal from the accessory antenna 24. Since the coil 18 is in close proximity with the phone antenna 32, minimal signal loss occurs. With the feed point 22 and the accessory antenna 24 raised above the top of the phone 30, radiation towards the user's head is decreased without adversely affecting the radiation pattern of the antenna 24.

It should be noted that bidirectional communication will generally take place, and that at certain times a signal received by element 24 will be coupled through coil 18 into antenna 32.

While the invention has been particularly shown and described with respect to preferred embodiments thereof, it will be understood by those skilled in the art that changes in form and details may be made therein without departing from the scope and spirit of the invention.

What is claimed is:

1. An accessory RF unit used in combination with a hand-held wireless telephone, comprising:

a housing, wherein said housing contains a recess to accept an antenna of said wireless telephone;

means for coupling said housing to said wireless telephone such that said antenna of said wireless telephone is at least partially disposed within said recess;

a coil disposed about said recess, wherein said coil electromagnetically couples an RF signal to and from said antenna of said wireless telephone;

an accessory antenna mounted to said housing; and an electrical conductor that electrically couples said coil to said accessory antenna; wherein said coil is tuned to match the transmitted frequency of said antenna of said wireless telephone, and wherein said coil is tuned at least in part using an external reactance disposed parallel to or in series with said coil.

2. An accessory RF unit as in claim 1 wherein the housing is constructed of lightweight plastic.

3. An accessory RF unit as in claim 1 wherein the housing further comprises a cylindrical tube for storage of a telescoping antenna adjacent to said wireless telephone, whereby the profile of said wireless telephone remains substantially the same when said accessory RF unit is operably attached to said wireless telephone.

4. An accessory RF unit as in claim 1 wherein the interior of said housing is coated with an electrically conductive layer, whereby electromagnetic energy is restricted to the interior of said housing.

5. An accessory RF unit as in claim 1 wherein means for retaining said housing to said wireless telephone is achieved through a compression fit of said housing to an outer surface of said wireless telephone.

6. An accessory RF unit as in claim 1 wherein means for retaining said housing to said wireless telephone is achieved by at least one clip on said housing engaging a mating surface on said wireless telephone.

7. An accessory RF unit as in claim 1 wherein said coil is tuned at least in part using self-resonance properties of said coil.

8. An accessory RF unit as in claim 1 wherein said accessory antenna is comprised of a monopole antenna.

9. An accessory RF unit as in claim 1 wherein said accessory antenna is comprised of a dipole antenna.

10. An accessory RF unit as in claim 1 wherein said accessory antenna is at least partially retractable within said housing.

11. An accessory RF unit as in claim 10 wherein said partially retractable accessory -antenna has an upper radiating portion and a lower elevating portion, whereby when said partially retractable accessory antenna is extended the upper radiating portion is held above a wireless telephone user's head.

12. An accessory RF unit as in claim 1 wherein said accessory antenna is a dual band antenna.

13. An accessory RF unit as in claim 1 wherein said accessory antenna is comprised of two separate antennas.

14. An accessory RF unit as in claim 1 wherein said electrical conductor is comprised of a coaxial cable.

15. A method for transmitting a signal from a wireless telephone, comprising the steps of:

energizing a first antenna of the wireless telephone with an RF transmission signal;

electromagnetically coupling the signal from the first antenna to an electrical conductor that is disposed external to the telephone; and radiating the RF transmission signal with a second antenna that is disposed external to the telephone and that is coupled to the electrical conductor; wherein the step of electromagnetically coupling said signal from said first antenna comprises an initial step of circumferentially surrounding said first antenna with a coil; wherein the initial step of circumferentially surrounding said first antenna with a coil further comprises the step of tuning the coil to match an output carrier frequency of a transmitter of said wireless telephone; and wherein the step of tuning said coil further comprises the step of providing an external reactance parallel to or in series with said coil.

16. A method as in claim 15 wherein the step of tuning said coil further comprises the step of selecting a coil which self-resonates at said output carrier frequency of said transmitter of said wireless telephone.

17. A method for receiving a signal originating from a base station with a wireless telephone, comprising the steps of:

receiving an RF transmission signal with a first antenna that is disposed external to the telephone and that is coupled to an electrical conductor disposed external to the telephone; and electromagnetically coupling the signal from said electrical conductor to a second antenna that forms a part of the wireless telephone, wherein the step of electromagnetically coupling said signal from said electrical conductor to said second antenna comprises initial steps of surrounding at least a portion of said second antenna with at least one coil, and tuning said at least one coil in accordance with a frequency band of interest using an external reactance that is parallel to or in series with said at least one coil.

* * * * *